United States Patent [19]

Koch et al.

[11] Patent Number: 4,857,715

[45] Date of Patent: Aug. 15, 1989

[54] OVERPRINT REGISTRATION SYSTEM FOR PRINTING A CUSTOMIZED SURVEY FORM AND SCANNABLE FORM THEREFOR

[75] Inventors: Vernon F. Koch, Prior Lake; John G. Fahnlander, Shakopee; Lester A. Wanninger, Edina, all of Minn.

[73] Assignee: National Computer Systems, Inc., Minneapolis, Minn.

[21] Appl. No.: 176,610

[22] Filed: Apr. 1, 1988

[51] Int. Cl.[4] .............................................. B06K 7/10
[52] U.S. Cl. .................................... 235/456; 235/494; 235/487; 235/470
[58] Field of Search ............... 235/456, 470, 487, 494; 354/7; 101/93.01

[56] References Cited

U.S. PATENT DOCUMENTS

| | | |
|---|---|---|
| 3,793,472 | 2/1974 | Sternberg et al. |
| 3,900,961 | 8/1975 | Sokolski et al. |
| 4,015,034 | 3/1977 | Smolen |
| 4,027,142 | 5/1977 | Paup et al. |
| 4,322,754 | 3/1982 | Mason |
| 4,401,024 | 8/1983 | Frentress |
| 4,534,288 | 8/1985 | Brovman |
| 4,538,059 | 8/1985 | Rudland |
| 4,736,109 | 5/1988 | Djorsak .......... 235/456 |

Primary Examiner—Harold I. Pitts
Attorney, Agent, or Firm—Dorsey & Whitney

[57] ABSTRACT

A scannable form for an optical mark scanning apparatus in the form of a generally rectangular sheet of paper or like material having a preprinted timing track along one edge and a plurality of preprinted quality assurance marks is printed by a laser printer with customized questions and corresponding response bubbles to create a survey form. An overprint registration system is used in conjunction with the scannable forms to align material for printing on the scannable forms prior to printing the survey form by printing an overprint registration mark corresponding to at least one of the quality assurance marks and adjusting the position of said overprint registration mark to establish the alignment between the response bubbles to be printed and the preprinted timing track. The system may also include a verification process wherein a plurality of alignment marks will be overprinted in the position of said overprint registration marks during the printing of the survey form, so that the alignment of each form in relation to the quality assurance marks may be verified during scanning.

6 Claims, 9 Drawing Sheets

Fig. 3

Toothpaste Survey

John Smith
Anystreet
Any apt
Any City, State, Zip
Any phone

Proper Mark
USE A NO.2 PENCIL

1. How important is each of the following in the toothpaste you use?

| | Extremely important | | Neither | | Extremely unimportant |
   |---|---|---|---|---|---|
   | Prevents cavities | ○ | ○ | ○ | ○ | ○ |
   | Whitens teeth | ○ | ○ | ○ | ○ | ○ |
   | Freshens breath | ○ | ○ | ○ | ○ | ○ |
   | Pleasant taste | ○ | ○ | ○ | ○ | ○ |
   | Price | ○ | ○ | ○ | ○ | ○ |

2. My favorite toothpaste helps me...

| | Extremely good | | Neither | | Extremely bad |
   |---|---|---|---|---|---|
   | Prevent cavities | ○ | ○ | ○ | ○ | ○ |
   | Whiten teeth | ○ | ○ | ○ | ○ | ○ |
   | Freshen my breath | ○ | ○ | ○ | ○ | ○ |
   | Has a pleasant taste | ○ | ○ | ○ | ○ | ○ |

3. My favorite toothpaste is: _____

4. About how many times do you use toothpaste each day on average?
   - ○ 0
   - ○ 1
   - ○ 2
   - ○ 3
   - ○ 4 or more 5. What form of toothpaste do you normally use?
   - ○ Paste
   - ○ Gel
   - ○ Paste/gel combination
   - ○ Don't know 6. What type of toothpaste do you normally use?
   - ○ Fluoride
   - ○ Non-fluoride
   - ○ Don't know 7. Who decides which brands you use?
   - ○ Yourself
   - ○ Spouse
   - ○ Parent
   - ○ Other 8. Where do you most often purchase toothpaste?
   - ○ Drug store
   - ○ Supermarket
   - ○ Discount store
   - ○ Other 9. What is the most important reason you usually purchase your favorite toothpaste?
   - ○ Prevents cavities
   - ○ Whitens teeth
   - ○ Freshens breath
   - ○ Pleasant taste
   - ○ Price
   - ○ Form - paste or gel
   - ○ Type - fluoride or not
   - ○ Tube or can
   - ○ Other Page 1     5056

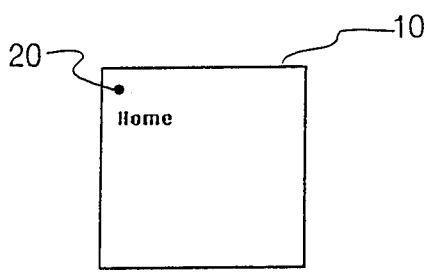
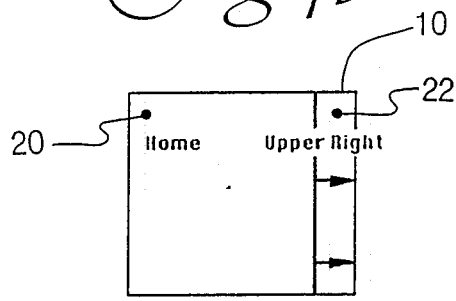
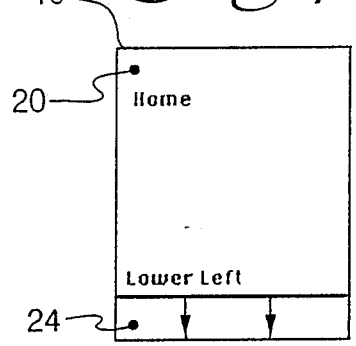
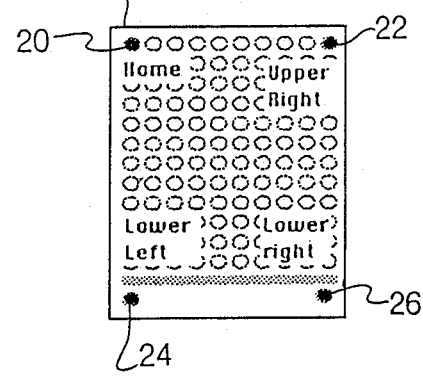
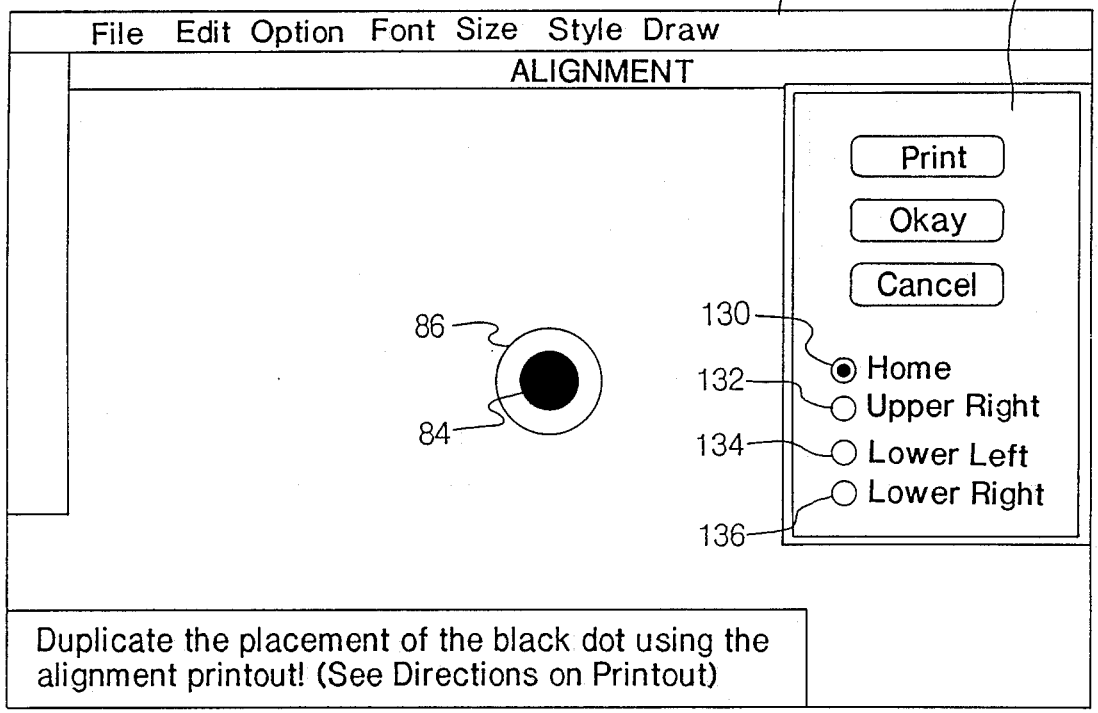

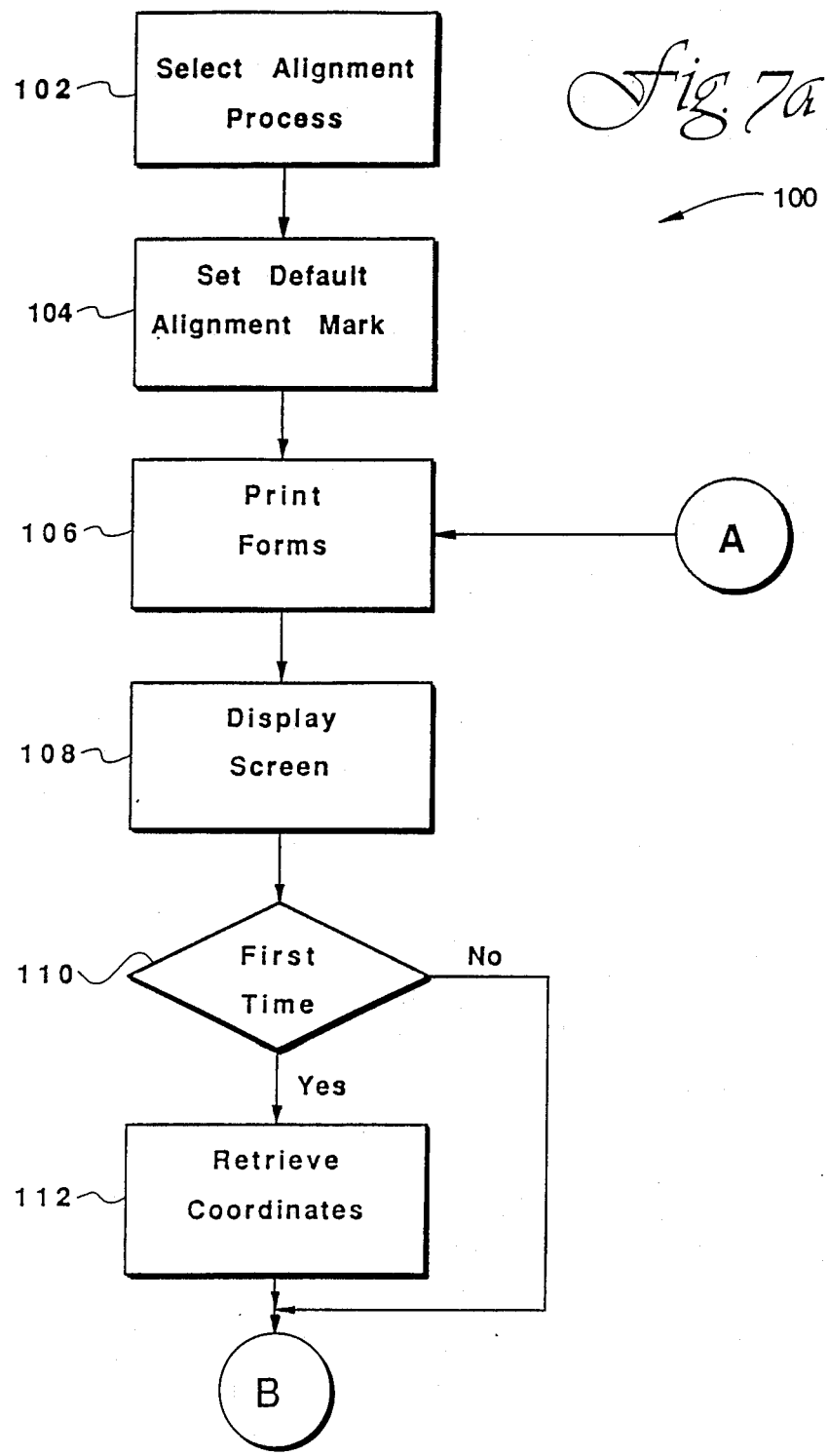

OVERPRINT REGISTRATION SYSTEM FOR PRINTING A CUSTOMIZED SURVEY FORM AND SCANNABLE FORM THEREFOR

TECHNICAL FIELD

The present invention relates generally to the field of optical mark scanning apparatus and scannable forms for such systems. More particularly, the present invention relates to a system for creating a customized survey form or questionnaire by utilizing preprinted registration marks on a blank scannable form as targets for overprinting to confirm printing alignment and to the scannable form for use in such a system. This type of scannable form has particular application in the creation of customized survey forms or questionnaires for use in conducting various types of market surveys and a wide variety of other data collection applications.

BACKGROUND ART

Optical mark reading (OMR) systems are well known in the prior art and there are many applications for the use of OMR scannable forms in the largescale gathering of information (e.g. student test scores, census information, consumer preference surveys or product survey forms). The scannable forms for use in such systems are sheets of paper or other similar material that typically have a plurality of preprinted timing marks in a control mark column (often referred to as a timing track) and a plurality of response areas located on the sheet in a specified relationship with the timing marks. The timing marks are used to trigger the OMR system to scan or "read" the response bubbles that comprise a selected response area to detect whether a data mark is present at a particular response bubble.

OMR systems are well-suited for gathering information contained in a large number of documents with data that can be stated numerically or categorically (i.e., multiple choice, yes or no). In a typical market survey application, a person would fill in the requested information on a scannable form by placing a data mark in the desired response bubbles. When completed, the scannable form is then fed into an OMR scanner that reads the data marks and transmits this data to a computer for editing, validation, and, ultimately, interpretation. While such OMR systems are an efficient means of gathering large amounts of information, it is generally not cost-effective to use current scannable forms with an OMR system to gather relatively small amounts of information (i.e. 5,000 surveys or less), particularly when the turn-around time for conducting a survey is limited or when a scannable form must be custom-designed for a survey.

The scannable forms for OMR systems of the type described above are either fixed format scannable forms having only response areas and no corresponding questions printed on the form (e.g., 50 true/false response areas), or custom scannable forms with specific questions (or other stimulus items, such as graphics) printed corresponding to each response area (e.g., a census survey). Fixed format scannable forms are inexpensive, but are limited in arrangement and require another document or a survey administrator to pose the questions, because fixed format scannable forms do not combine both the question and response area on a single document. Custom scannable forms are more flexible in their format, but are expensive and may require as many as 5,000 copies of the same form to be printed before the costs involved in designing and printing the forms by conventional offset printing methods are recovered. More importantly, the time required to print customized scannable forms by conventional offset printing methods is sometimes too long (requiring one to eight weeks from initial design to final printing), and does not meet the market needs of many potential OMR users, particularly when there is a shortened time requirement, as is often the case in market survey applications.

One of the difficulties in creating a customized scannable form for use in current OMR scanners is the low tolerance such scanners have for offset, misregistration, and poor print or paper quality. In particular, the timing tracks on scannable forms for such scanners must be printed to high standards of print quality and print alignment to insure that an acceptable number of completed forms can later be properly scanned and scored. For example, photocopying a typical custom scannable form might produce scannable forms with a very low acceptance rate in current OMR scanners. This misalignment and poor print quality that causes such a low acceptance rate occurs because photocopy machines do not copy a page at exactly one hundred percent of its original size and because the alignment of the paper is not handled as precisely as in a conventional printing press. With the large costs involved in detecting and entering information from rejected forms, such a low acceptance rate is not tolerable in most OMR applications.

Similarly, customized survey forms created and printed by currently available laser printing using, for example, standard paint and draw software programs (e.g., MacDraw) will also have acceptance rates that are lower than desired. In particular, the print quality and alignment for the timing tracks required by current OMR scanners cannot be replicated by a laser printer for several reasons. First, current laser printers are not capable of printing along the edge of the form where the timing tracks for most OMR scanners are located. In addition, the print registration and image size required for the timing tracks is generally higher than can be obtained using a conventional laser printer. The paper handling mechanism in most laser printers varies from printer to printer and may be somewhat inconsistent in the alignment of the paper stock as it is fed through the laser printer. Finally, there is usually no means for accurately detecting the edge of the paper stock as it passes under the print head of a laser printer, causing the print area generated by the laser printer to "float" up and down from document to document.

A possible partial solution is the use of a blank scannable form having only a preprinted timing track as the paper stock for a laser printer. But the previously mentioned problems with alignment and consistency mean that there is still no way of establishing accurate alignment between the preprinted timing track on such a form and the corresponding rows of response bubbles to be printed by the laser printer. Current OMR scanners use the timing marks in the timing track to trigger when to scan the corresponding row of response bubbles in the response area. Consequently, if the response bubbles are not printed in relatively exact alignment with the corresponding timing mark, the OMR scanner may interpret the edge of a response bubble as a positive response or mark, rather than as a guide for the user filling in the data mark. Without a method of aligning the response bubbles with the corresponding timing marks, the resulting customized survey forms will not be consistently and correctly scanned by current OMR scanners.

Although the existing OMR scanners and scannable forms may be satisfactory for other uses and applications, because of the problems recited above they are not well-suited for quickly gathering information from a relatively small sample population by means of a customized scannable form. Accordingly, there is a continuing need of improvements in scannable forms for OMR systems to allow for the timely and cost-effective creation of customized scannable forms or survey forms that will be consistently and correctly scanned by current OMR systems.

SUMMARY OF THE INVENTION

In accordance with the present invention, a scanning system, and, in particular, a scannable form for such a system, is provided in which preprinted quality assurance (QA) marks on a scannable form are overprinted with overprint registration marks in a printer alignment process prior to final printing of customized survey forms. The preprinted QA marks are also overprinted with alignment marks during the final printing of the customized scannable form to verify proper alignment of the print area. Generally, such a system includes a preprinted scannable form having a plurality of timing marks and a plurality of quality assurance (QA) marks preprinted thereon; a processing means for entering, editing, and formatting customized questions and corresponding response bubbles and for adjusting the location of overprint registration marks, together with the questions and response bubbles to be printed on the scannable form; and a laser printer for printing the overprint registration marks, the alignment marks, the customized questions and the corresponding response bubbles on the scannable form to create a customized survey form or "questionnaire". The present invention may also include an OMR scanner and attached processing means for scanning the survey forms and tabulating and analyzing the results.

More specifically, the present invention relates to a survey form for use in an OMR scanner in which a scannable form comprised of a generally rectangular sheet of paper or similar material having a timing track preprinted along one edge and a plurality of QA marks preprinted as, for example, circle outlines in each corner is used as the stock paper for a laser printer that will print the customized questions (or other stimulus items) and corresponding response bubbles that comprise the survey form. The QA marks and the timing track are preprinted in a specified relation so that alignment with the QA marks can also accomplish alignment with the timing track. Prior to final printing of the survey form, an alignment process is performed wherein a number of scannable forms will have an overprint registration mark overprinted corresponding to each of the QA marks. If the overprint registration marks are not aligned, the position of the overprint registration marks will be adjusted and the process repeated until all of the overprint registration marks and approximately centered within the corresponding circle outlines of the QA marks. The positional information used to adjust the location of the overprint registration marks is stored as horizontal and vertical home and offset values that indicate the relationship between the expected location of the timing track and the actual location of the timing track as established by this alignment process. During the final printing of the survey forms, the registration system uses these values to properly align the customized questions and corresponding response bubbles with the actual location of the preprinted timing track, thereby increasing the consistency and correctness with which such survey forms will be scored by an OMR scanning system. In addition, the registration system of the present invention may also include a verification process wherein some or all of the QA marks will be overprinted with alignment marks during the printing of the survey forms. The alignment of each survey form may be verified using this process, either by a visual check of the alignment marks on the survey form after printing or by reading the alignment marks during later scanning of the user-completed survey forms.

Accordingly, a primary objective of the present invention is to provide a scannable form having a timing track and a plurality of QA marks preprinted thereon to be overprinted with corresponding overprint registration marks prior to the printing of a survey form comprising a series of questions and corresponding response bubbles such that the positioning of the overprint registration marks relative to the preprinted QA marks is used to modify the locations at which the questions and response bubbles are printed so that the questions and response bubbles will be properly aligned with the preprinted timing track.

Another objective of the present invention is to provide for a method of adjusting a series of overprint registration marks with respect to a corresponding series or preprinted QA marks on a scannable form having a timing track printed thereon in a specified relation to the preprinted QA marks.

A further objective of the present invention is to provide a registration system to create a survey form by entering and formatting questions and corresponding response areas and then printing the questions and corresponding response areas on a scannable form in a specified relationship with a preprinted timing track as determined by an alignment process.

Another objective of the present invention is to provide a method of verifying the alignment between a plurality of questions and corresponding response areas that comprise a survey form and a plurality of preprinted timing marks on the scannable form by overprinting a plurality of alignment marks on the scannable form in a specified relation with a plurality of preprinted QA marks and verifying the relationship between the alignment marks and the QA marks either visually after the survey form is printed and/or by an OMR scanner when the survey form is scanned.

These and other objectives of the present invention will become apparent with reference to the drawings, the detailed description of the preferred embodiment and the appended claims.

DESCRIPTION OF THE DRAWINGS

FIG. 3 is a survey form produced by the registration system of the present invention, including customized questions, response bubbles, and alignment marks, printed on a blank scannable form.

FIGS. 4a–4d are a pictorial view of a scannable form during the steps comprising the alignment process of the present invention.

FIG. 6 is a depiction of a computer screen display showing the positioning of an overprint indication mark during the alignment process of the present invention.

FIGS. 7a–7b are a flowchart of the software program for the alignment process of the present invention.

DESCRIPTION OF THE PREFERRED EMBODIMENT

Figure 1:
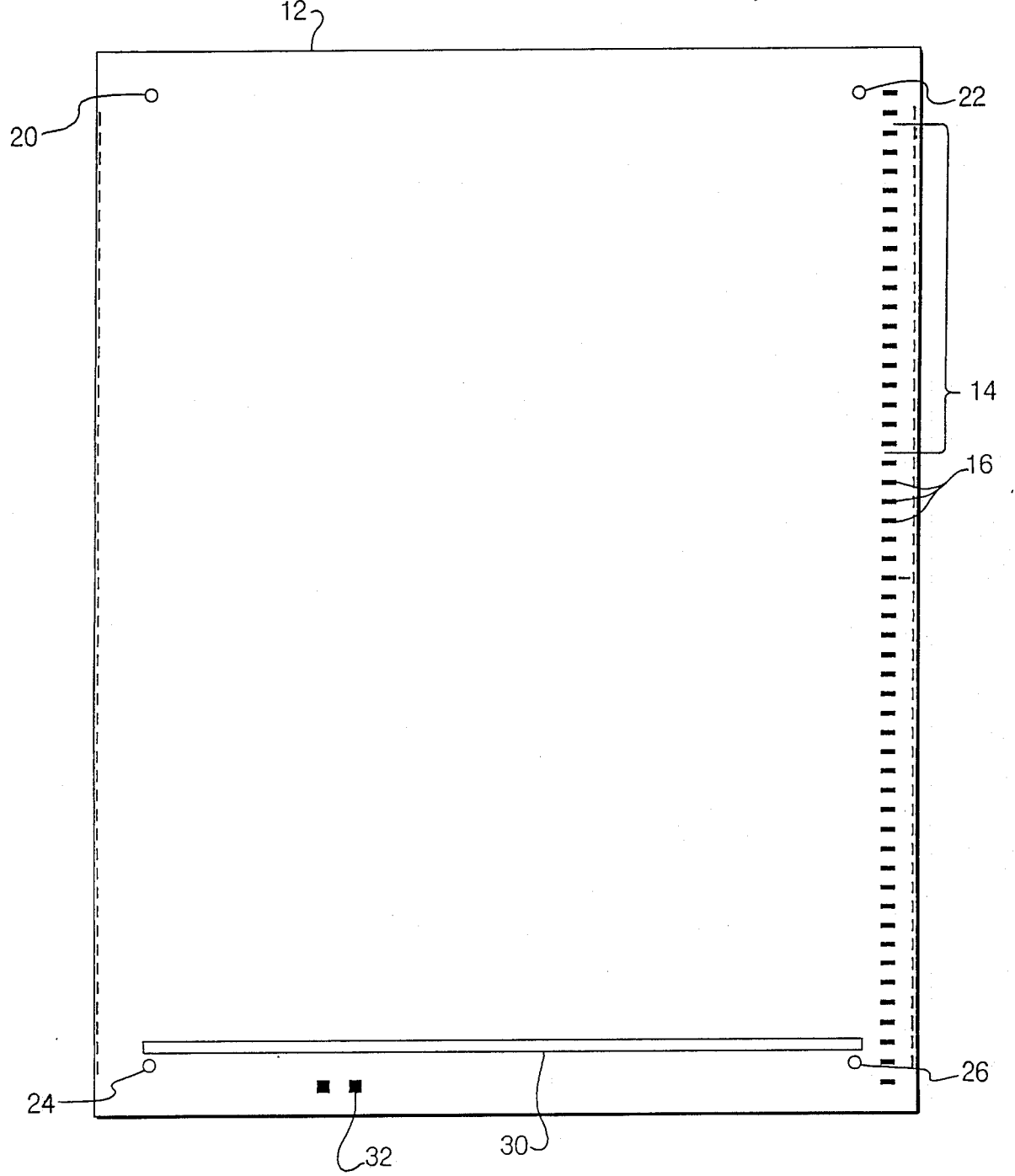
FIG. 1 is a blank scannable form with preprinted QA marks and timing track in accordance with the present invention.

Referring now to FIG. 1, the operative elements of a scannable form in accordance with the present invention are shown. In a preferred embodiment of the present invention, scannable form 10 is comprised of a generally rectangular paper sheet 12 having a timing track 14 consisting of a row of uniformly spaced preprinted timing marks 16 located along one edge of sheet 12 and a plurality of preprinted quality assurance marks 20, 22, 24, and 26 (the QA marks). The QA marks 20, 22, 24, and 26 are preprinted in a known, predetermined relationship with timing track 14. In one embodiment, QA marks 20, 22, 24 and 26 are preprinted using a non-readable ink (i.e. an ink that will not be detected by the scanner), that is fainter and a different color than timing marks 16. Sheet 12 may also be preprinted with bias bar 30 and skunk marks 32. Bias bar 30 is used to adjust the scanner intensity level. Skunk marks 32 may be used to verify the proper scannable form or to signal the end of the scannable form.

Figure 2:
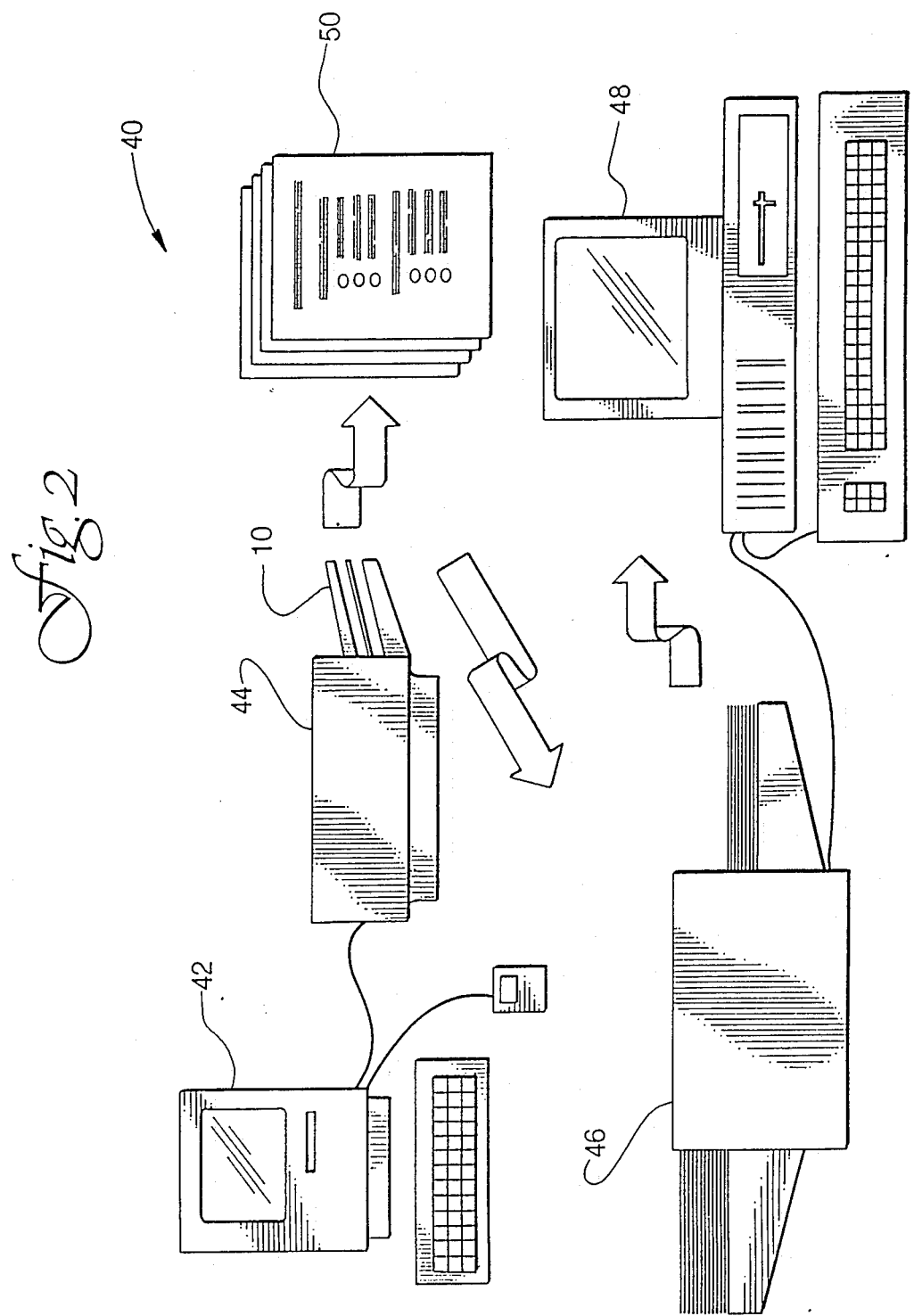
FIG. 2 is a pictorial view of the operative components of a registration system in accordance with the present invention.

As shown in FIG. 2, the operative components of a registration system 40 in accordance with the present invention will generally include, a computer 42 coupled with a laser printer 44 for overprinting scannable forms 10 to create survey forms 50. Once survey forms 50 are printed, they may then be taken to the field to collect the desired information using any number of collection methods. After survey forms 50 have been marked with the information being collected, survey forms 50 are scanned using scanner 46 coupled with computer 48. When the scanning process is finished, the scanned information may then be edited and verified, responses to open-ended questions may be encoded, and the resulting data is now ready for analysis and interpretation.

Referring also to FIG. 3, completed survey forms 50 have printed thereon customized questions 52, corresponding response bubbles 54, open-ended questions 56, graphics 57 and mail-merge locations 58 and mail merge control codes 59. Survey forms 50 may also be printed with ID number marks 70 and secondary skunk marks 72. Computer 42 is used for entering, editing, and formatting customized questions 52 and open-ended questions 56, along with entering, editing, and formatting the response bubbles 54 corresponding to customized questions 52.

In a preferred embodiment of the present invention, computer 42 is an *Apple Macintosh SE* available from Apple Computers, Inc., of Cuppertino, Calif. Laser printer 44 is an *Omni Laser* 2115 available from Texas Instruments, Inc., Dallas, Texas. Scanner 46 is a *NCS Sentry* 3000 available from National Computer Systems of Eden Prairie, Minn. and computer 48 is an IBM PS/2 Model 30 available from International Business Machines, Armonk, N.Y. While the preferred embodiment of the present invention utilizes a laser printer for printing the overprint registration marks and then printing the alignment marks, the customized questions and the corresponding response bubbles, it should be understood that any printer capable of the resolution and control achieved by a laser printer would work equally well. It should also be understood that other scannable forms having different print spacings and timing tracks for use in different scanners may also be used with the present invention. The present invention may work equally well with either single-sided or double-sided scannable forms. Moreover, the present invention is equally applicable to forms scanned either by a Trans-Optic method of scanning (light transmitted through the form) or by a reflective-read method of scanning (light reflected from the surface of the form). Finally, the response areas need not be associated with a question expressed primarily in text; graphics or other stimulus items suitably leading a subject to respond may be used.

In the description of the preferred embodiment that follows, the terms vertical and horizontal will be used in reference to the orientations of scannable form 10 and survey form 50. Vertical refers to the dimension of scannable form 10 parallel to the direction of travel of survey form 50 through scanner 46. In the preferred embodiment of the invention, scannable form 10 travels through laser printer 44 in the same direction of travel as through scanner 46; however, it will be obvious that the orientation of scannable form 10 traveling through laser printer 44 may be either portrait (vertical) or landscape (horizontal) as long as the proper spatial relationship between QA marks 20, 22, 24, and 26 and timing track 14 is specified. Horizontal refers to the dimension of scannable form 10 perpendicular to the direction of travel of survey form 50 through scanner 46. For most OMR scanners, timing track 14 is located along one of the vertical edges of scannable form 10. A horizontal line of response bubbles 54 with its corresponding timing mark 16 is sometimes referred to as a row of response bubbles. A vertical line of response bubbles 54 may be referred to as a column of response bubbles.

Also, throughout the description of the preferred embodiment, the following definitions of various terms will be used to help clarify the invention. The term "scannable form" will be used to refer to the blank form having only a timing track prior to printing any customized questions 52 or response bubbles 54 thereon, while the term "survey form" will be used to refer to the completed form having customized questions 52 and response bubbles 54 printed thereon by laser printer 44. The term "alignment form" is a scannable form that has received one or more overprint registration marks during the alignment process. The term QA mark will refer to the preprinted reference areas on the blank scannable form, QA marks 20, 22, 24, and 26. The term overprint registration mark will refer to a mark printed over a QA mark during the alignment process, overprint registration marks 60, 62, 64, and 66 (FIG. 5), and the term alignment mark will refer to a mark printed outside or inside a QA mark and referenced during the print-verification process, alignment marks 92, 94, and 96.

It will be understood that the spatial relationship between QA marks 20, 22, 24, and 26 and timing track 14 is specified and programmed into registration system 10. It is this predetermined relationship between QA marks 20, 22, 24, and 26 and timing track 14 that permits the QA marks to be used as guides for determining the critical proper alignment between a row of response bubbles 54 and the corresponding timing mark 16. In the preferred embodiment of the scannable form 10 as shown in FIG. 1, timing track 14 consists of a column of fifty-two (52) timing marks 16, each timing mark 16 being a rectangle having a horizontal dimension of 0.150 inches and a vertical dimension of 0.055 inches, uniformly spaced 0.200 inches apart from one another. This format is known as 5LPI (lines per inch) because there are five rows of response bubbles 54 and corresponding timing marks 16 in each vertical inch of scannable form 10. Other typical formats for scannable forms include 8LPI, 6LPI, and 4LPI.

For a particular scanner 46 and scannable form 10 there will be a specified detection area comprising a row of detection masks 55 (FIG. 3) for each timing mark 16. Each detection mask 55 is a "window" that scanner 46 uses to check for the presence or absence of a data mark in each response bubble 54 in that row. A detection mask 55 of scannable form 10 in the preferred embodiment is shown as a circle outline inscribed within response bubble 54. The ability of scanner 46 to properly detect the presence or absence of a data mark in detection mask 55 will depend upon several factors, including, among other things, the shape and size of the scanner head, the discrimination level of the scanner, the intensity, shape and consistency of the data mark, and the alignment of detection mask 55 with respect to the corresponding timing mark 16 and the quality of the paper.

There are two competing consideration that must be balanced to achieve an acceptable acceptance rate when scanning a form: (1) the risk of not detecting a valid data mark (the Alpha condition); and (2) the risk of detecting an invalid mark as a valid data mark (the Beta condition). The optimum probability distribution maximizing the Alpha condition and minimizing the Beta condition will vary depending on the particular scannable form 10 and scanner 46 being used. By optimizing this probability distribution and by knowing the discrimination level of the scanner, it is possible to obtain a maximum vertical and horizontal tolerance that a data mark may be displaced within a response bubble 54 and still be properly scored, or that an alignment mark may be displaced with respect to a QA mark and still have survey form 50 in proper alignment.

One of the ways the present invention overcomes the alignment problems inherent in using a laser printer to print a form with a preprinted timing track is by printing response bubbles 54 that are "oversized" in relation to detection mask 55. Oversized response bubble 54 allow for the optimum use of the vertical and horizontal tolerances in aligning scannable form 10. The vertical and horizontal tolerances defining the difference in areas between response bubble 54 and detection mask 55 are determined from the observed statistical average variations in the vertical and horizontal dimensions as printed by a particular type of laser printer 44. Essentially, the offsets and alignment for the maximum horizontal and vertical tolerances for scannable form 10 need only be accurate enough to keep a response bubble 54 circumscribed around its corresponding detection mask 55. This is best accomplished by optimizing the Alpha and Beta conditions as described above.

Using a similar optimization of Alpha and Beta conditions, the location and size of alignment marks 92 and 94 can be determined. Essentially, alignment marks 92 and 94 are printed as circles with an inner diameter larger than the outer diameter of QA marks 22 and 24, but with an outer diameter smaller than the inner diameter of response bubble 54. By making the horizontal and vertical tolerances for alignment marks 92 and 94 smaller than the corresponding tolerances of response bubble 54, an out-of-alignment condition as indicated by scanner 46 sensing either alignment mark 92 or 94 as a valid data mark will occur before any of the response bubbles 54 would be incorrectly tabulated as a valid data mark.

Referring now to FIGS. 4a-4d and FIG. 5, a simplified explanation of the function and operation of QA marks 20, 22, 24 and 26 in combination with overprint registration marks 60, 62, 64, and 66 is shown. Essentially, the alignment process of the present invention "stretches" the planned print area on scannable form 10 so that overprint registration marks 60, 62, 64, and 66 will align with preprinted QA marks 20, 22, 24, and 26. The object of the alignment process is to center overprint registration marks 60, 62, 64, and 66 within their respective QA marks 20, 22, 24, and 26. As shown in FIG. 4a, the first step in performing alignment process 100 is to "target" the alignment by anchoring scannable form 10 with overprint registration mark 60 printed within home QA mark 20 to establish a base reference point for the planned print area. In the preferred embodiment, home QA mark 20 is located in the upper left hand corner of scannable form 10, at the corner of the edges opposite both timing track 16 and bias bar 30. While the exact location of home QA mark 20 is not critical to the invention, it is desirable to allow the "stretching" of the form to occur in the direction of those areas of survey form 50 that are most critical to the accurate scoring of the form, namely timing track 16 and the coded information below bias bar 30.

Figure 5:
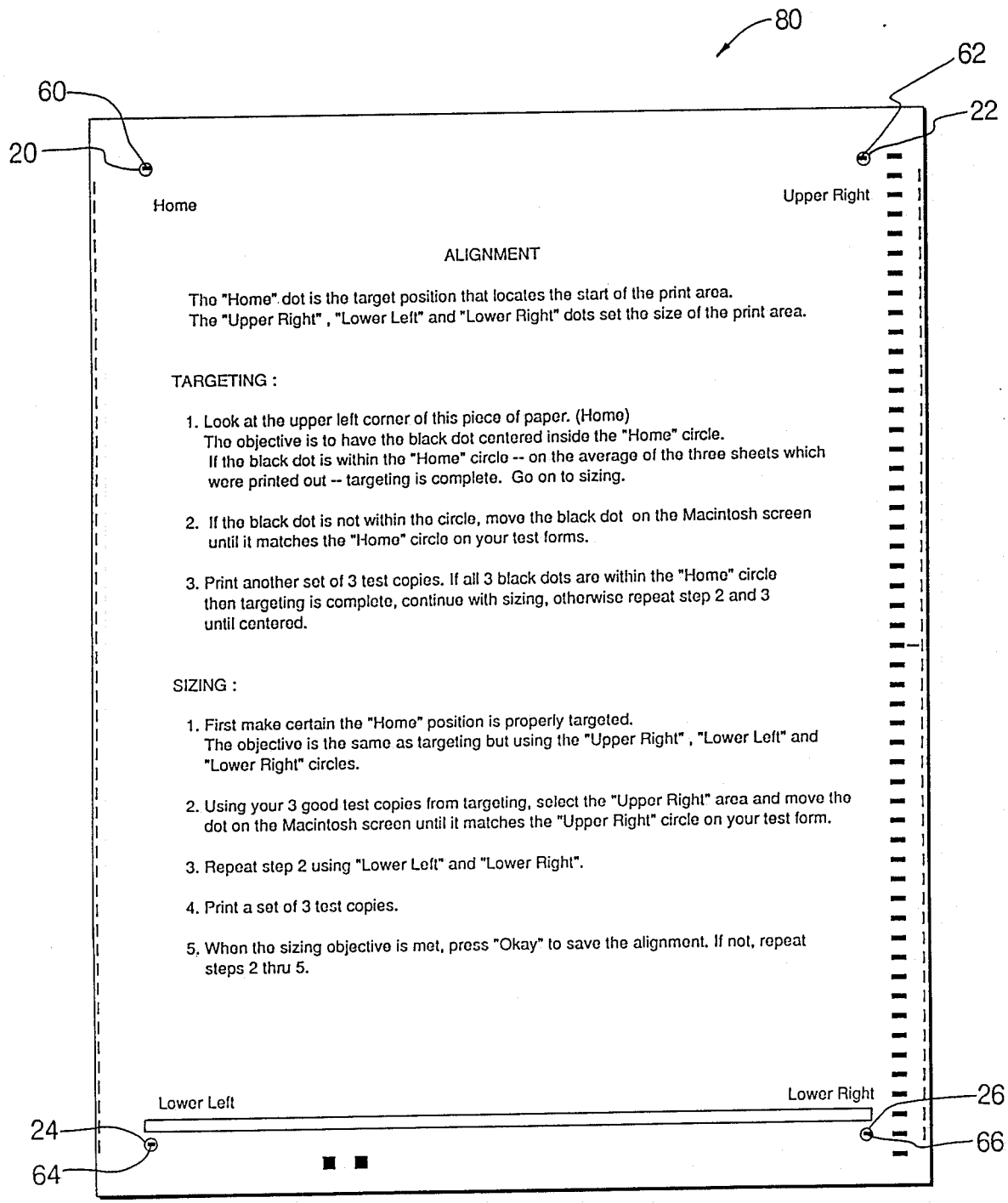
FIG. 5 is a scannable form printed with alignment instructions during the alignment process of the present invention.

As a first step in the alignment process, computer 42 instructs laser printer 44 to use three copies of scannable form 10, printing overprint registration mark 60 that is intended to be aligned with home QA mark 20, to produce an alignment form 80. It will be seen that only overprint registration mark 60 may be printed, or all of the overprint registration marks 60, 62, 64 and 66 may be printed simultaneously. To facilitate the use of alignment process 100, the three scannable forms 10 are also printed with step by step instructions (as shown in FIG. 5) that state the evaluation criteria for aligning alignment forms 80. In the preferred embodiment, three copies of alignment form 80 are printed at each step in the alignment process because laser printer 44 will have a normal variance in the exact locations at which information will be printed on scannable form 10 due to the somewhat inexact paper feeding and the unique alignment characteristics of the particular laser printer 44 being used. By printing three copies of alignment form 80, a rough average of the location of overprint registration mark 60 can be estimated.

After the initial three copies of alignment form 80 are printed, an alignment screen 82 that shows overprint mark indicator 84 in proper alignment with QA mark indicator 86 is displayed, as shown in FIG. 6. The user examines all three copies of alignment form 80 and notes the average location of overprint registration mark 60. The user next enters the extent of deviation from the desired alignment by duplicating the average location of overprint registration mark 60 on alignment screen 82 by moving overprint mark indicator 84 to its observed average position with respect to QA mark indicator 86. Computer 42 then modifies the stored location information for overprint registration mark 60 based on the movement of overprint mark indicator 84 and prints another three copies of alignment form 80. This process is repeated until the user is satisfied that the average location of overprint registration mark 60 is centered as closely as possible within QA mark 20.

With home QA mark 20 anchoring the print area of scannable form 10, the user may now stretch the print area to the proper size. The "sizing" of the form begins with the upper right as shown in FIG. 4b by centering overprint registration mark 62 with respect to QA mark 22. This is done using the same display of average observed deviation on alignment screen 82. Next, the lower left corner is sized as shown in FIG. 4c by centering overprint registration mark 64 with respect to QA mark 24. Finally, the lower right corner is sized as shown in FIG. 4d by centering overprint registration mark 66 with respect to QA mark 26. The same iterative process as described above is used for each of these steps. The resulting "aligned" scannable form 10 is shown in FIG. 5.

Though the repetitive process of printing three copies of alignment form 80 during the alignment process may increase the accuracy of the alignment of survey forms 50, it should be noted that the objective of the present invention may be accomplished by printing a single scannable form with all of the overprint registration marks printed at the same time. It should also be noted that even though survey forms 50 require the use of QA marks 20, 22, 24, and 26 in combination with overprint registration marks 60, 62, 64, and 66, draft outputs for survey forms 50 may be printed for purposes of text or layout review without the need for using the alignment process.

It should be obvious that even though the marks shown are represented in the form of a circle, any geometric pattern or shape could be used to designate overprint registration marks 60, 62, 64, and 66 and the "target" QA marks 20, 22, 24, and 26 and still be within the scope of the present invention. The relationship between the overprint registration marks and the QA marks is such that scannable form 10 is aligned when overprint registration marks 60, 62, 64, and 66 shown as rectangles in a preferred embodiment in FIG. 5 are centered within QA marks 20, 22, 24, and 26. However, many other types of relationships between the overprint registration marks and the QA marks may be used to accomplish the same result. For example, overprint registration marks 60, 62, 64, and 66 might also be circle outlines to be overprinted circumscribing QA marks 20, 22, 24, and 26. QA mark 20, 22, 24, and 26 might form one-half of a design for which overprint registration marks 60, 62, 64, and 66 represent the other half of the design that will be aligned together, for instance two isosceles triangles to be aligned to create a parallelogram. Similarly, neither QA marks 20, 22, 24, and 26, nor overprint registration marks 60, 62, 64, and 66, must be only a single mark to practice the present invention. QA marks 20, 22, 24, and 26 might be a diagonal slash separated in the middle into two parts and overprint registration marks 60, 62, 64, and 66 would then be the diagonal slash that would connect the other two slashes when scannable form 10 is properly aligned. It can be seen that any number of designs for the overprint registration marks and QA marks are possible and the present invention should not be limited to the particular shapes of an outline of a circle and a solid dot as shown in the preferred embodiment.

When the alignment process is complete and any necessary text editing has been undertaken, survey forms 50 may be printed on scannable forms 10 using a print-verification process. Survey forms 50 are usually printed in batches of 100 to 500 forms. By printing survey forms 50 in such relatively small batches, the user is able to perform a visual check on the alignment of alignment marks 92, 94, and 96 with respect to QA marks 22, 24, and 26 to ensure that laser printer 44 has not "drifted" in its printing of the print area on scannable forms 10. For example, by aligning and stacking a small batch of survey forms 50, the user may quickly thumb through the lower right corners of the survey form to visually check the location of alignment mark 96 with respect to QA mark 26, primarily looking for any patterns of misalignment that might begin to develop, indicating that alignment process should be repeated. Other corners may be checked, as well. This visual verification allows the user to quickly flag and remove forms that are clearly misaligned (for example, if scannable form 10 was somehow skewed as it passed through laser printer 44), thereby increasing the acceptance percentage of the completed survey forms 50 by weeding out those forms with gross misalignment printing errors.

Alignment of the individual survey forms 50 can also be checked automatically by scanner 80. In one embodiment of the present invention shown in FIG. 3, QA marks 22 and 24 are overprinted with alignment marks 92 and 94 and QA mark 26 is overprinted with alignment mark 96 during the printing of survey forms 50. To assist in verifying the accuracy of alignment between QA marks 22 and 24 and alignment marks 92 and 94 by scanner 80, alignment marks 92 and 94 are printed as circles larger in diameter than QA marks 22 but smaller in diameter than response bubbles 54. Alignment mark 96 is printed as a solid circle within QA mark 26. Computer 48 can be instructed to verify that scanner 46 properly detected alignment mark 96 as a valid data mark, and that scanner 46 did not detect any valid data marks at QA marks 22 and 24, thereby indicating that alignment marks 92 and 94 were not detected. This inner/outer combination of alignment marks duplicates the optimization of the Alpha and Beta conditions for detecting valid data marks and not detecting invalid data marks, described above. It will be apparent that in another embodiment of the invention, the overprint registration marks and the alignment marks may be identical in appearance and would differ only in whether the mark is being overprinted on the blank scannable form during the alignment process, or on the completed survey form during the final printing of the survey form. In this case, computer 48 would instruct scanner 46 to detect the presence of a valid data mark at each QA location, thereby insuring that the survey form 50 was in proper alignment.

Figure 7B:
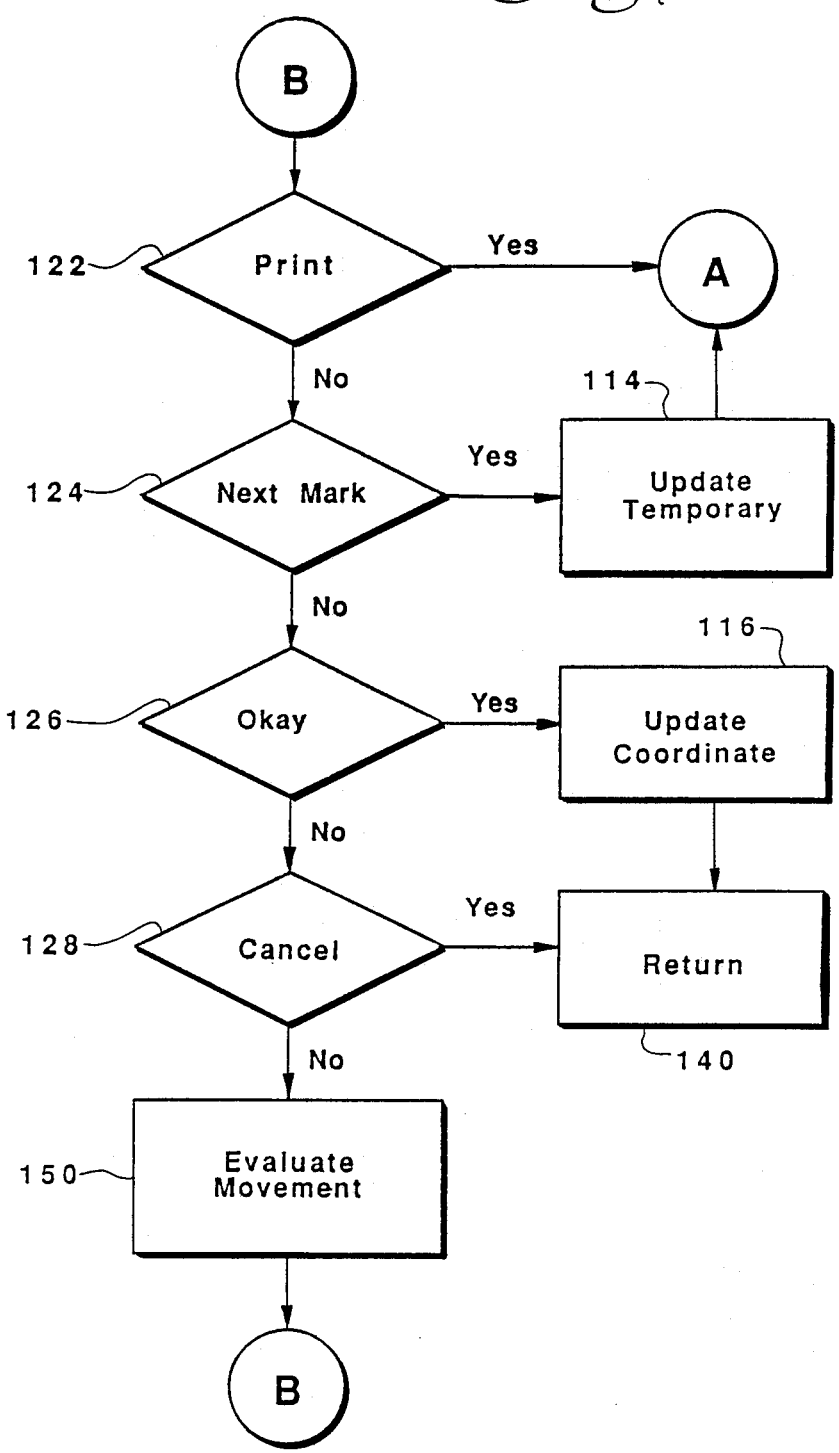
Figure 8A:
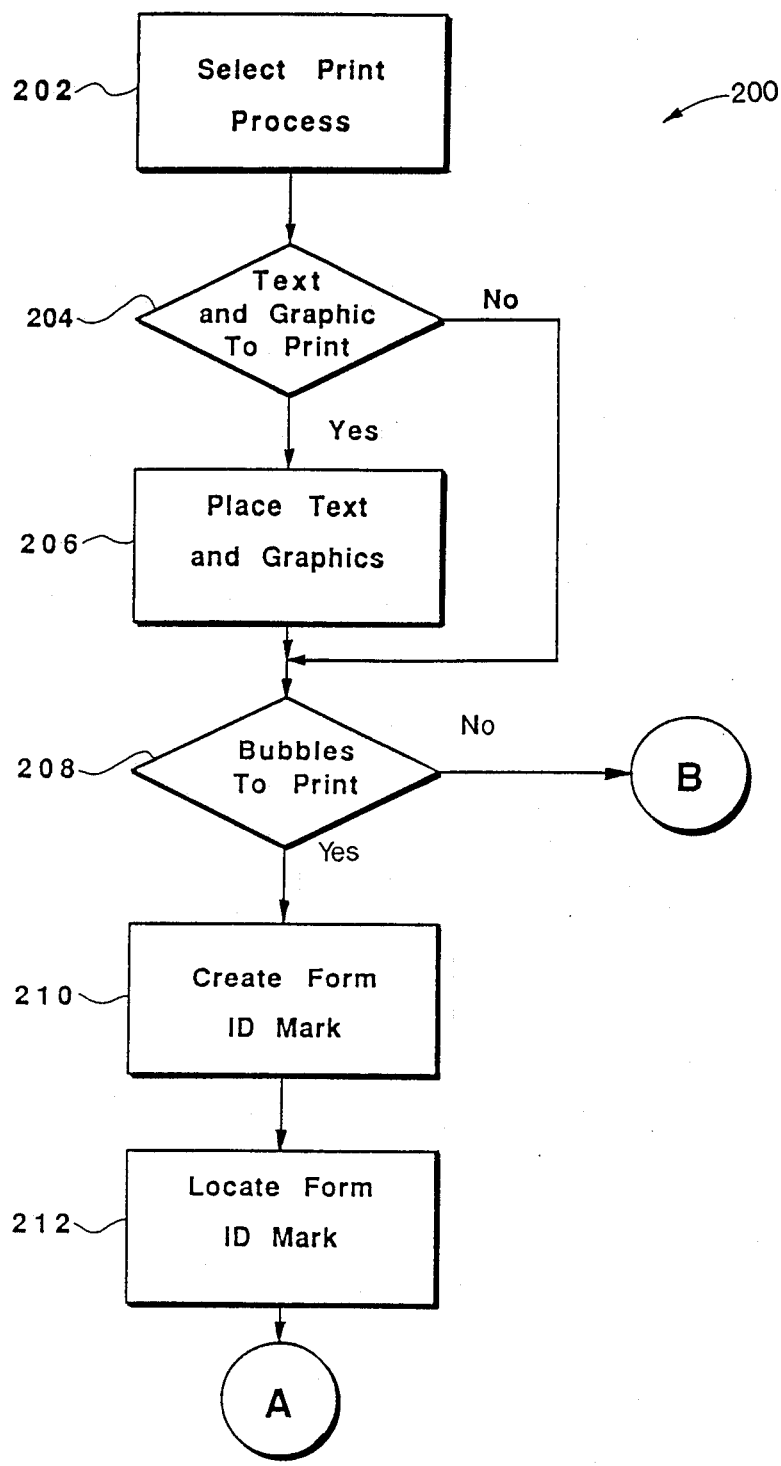
FIGS. 8a–8b are a flowchart of the software program for the print-verification process of the present invention.
Figure 8B:
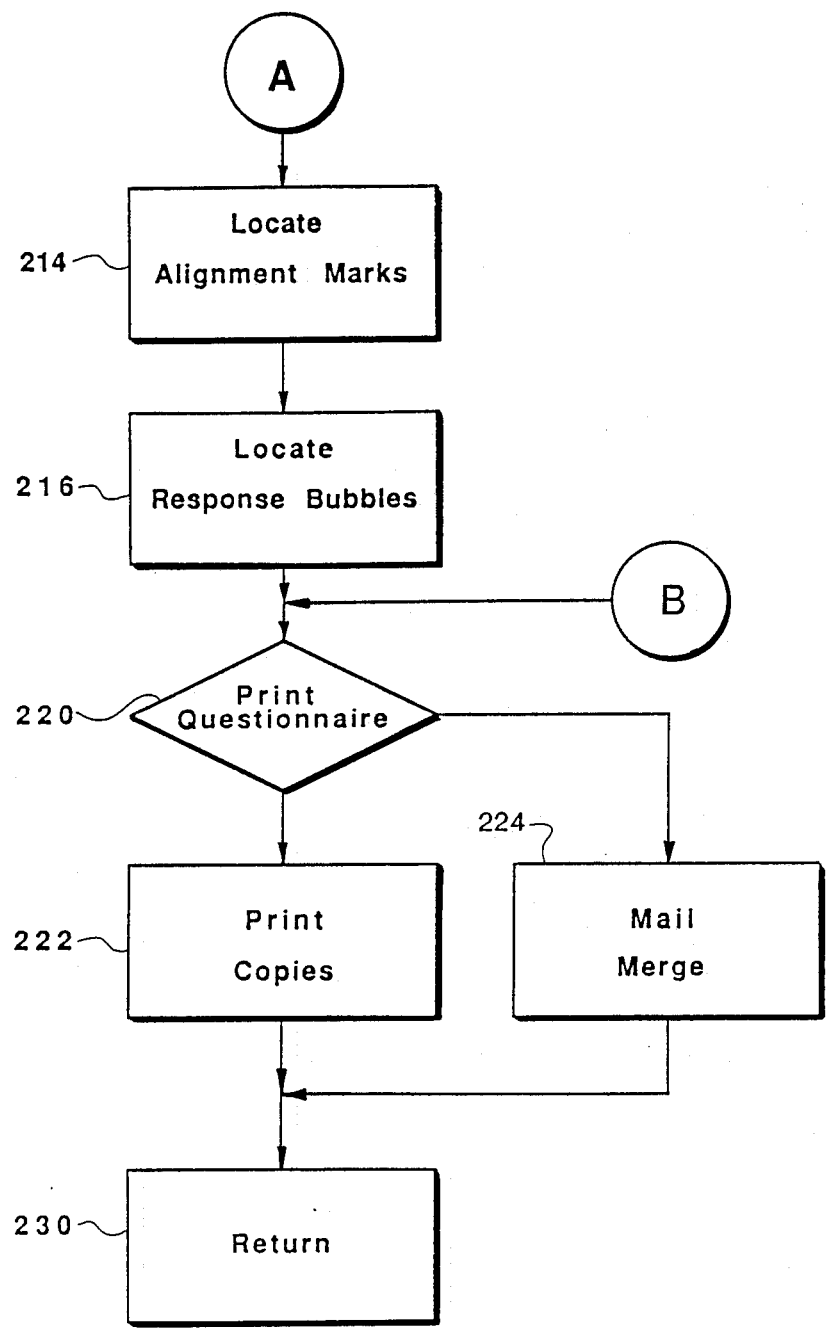

It is apparent that registration system 40 makes use of QA marks 20, 22, 24, and 26 in two distinct processes, an alignment process 100, as shown in FIGS. 7a–7b, and a print-verification process 200, as shown in FIGS. 8a–8b. While each process has certain advantages and may function independent of the other, combining both alignment process 100 and verification process 200 insures that response bubbles 54 will be properly aligned with the corresponding timing mark 16 in timing track 14, and that scanner 46 will accurately detect all of the information conveyed on each survey form 50 that was properly aligned, and that scanner 46 will also detect when a survey form 50 was not properly aligned.

Referring now to FIGS. 7a–7b, a functional flow chart for the software program that comprises alignment process 100 is shown. The user initiates alignment process 100 by selecting the Alignment Icon at Select Alignment Process 102. The default alignment mark for starting the alignment sequence is set to alignment mark 60 and the default coordinates for that alignment mark are set at Set Default Alignment Mark 104. The default coordinates for alignment mark 60 represent the distance from the top and left edges of sheet 12 to the center of QA mark 20. Three alignment forms 80 are printed at Print Forms 106 with overprint registration mark 60 located at the default coordinates. After the three alignment forms 80 are printed, alignment display screen 82 is presented to the user at Display Screen 108 as shown in FIG. 6. If this is the first time through alignment process 100 (First Time 110), Retrieve Coordinates 112 places the default coordinates for the centered overprint registration marks 60, 62, 64 and 66 into temporary storage to be modified. At this point, the user is ready to enter the average position of overprint registration mark 60 with respect to home QA mark 20. In the right hand portion of alignment screen 82, menu 120 displays the three alternatives available to the user (Print, Okay and Cancel), along with the select registration mark designators (Home 130, Upper Right 132, Lower Left 134, or Lower Right 136).

The user may select among any of the alternatives presented in menu 120, or may change the currently selected registration mark designator. Print 122 will print three copies of alignment forms 80 with all of the overprint registration marks 60, 62, 64 and 66 currently selected or previously aligned. Next Mark 124 compares the select registration mark designators Home 130, Upper Right 132, Lower Left 134 and Lower Right 136, with the currently selected overprint registration mark. If the two are not the same, the user has selected a different alignment mark to be aligned and the program will reflect the change and then print three copies of alignment form 80 using the coordinates stored in temporary storage to position the newly selected alignment mark. Okay 126 updates the old alignment mark coordinates with the coordinates currently stored in temporary storage (Update Coordinate 116) and then returns to the main screen at Return 140. Cancel 128 returns the control to the main screen at Return 140 without updating the old alignment mark coordinates.

If none of the above options were selected, Evaluate Movement 150 examines the placement of registration mark indicator 84 with respect to QA mark indicator 86 as shown on screen 82. It is apparent that registration mark indicator 84 and QA mark indicator 86 are shown in an enlarged size as compared to their actual size when printed on alignment form 80. The enlarged size allows the present invention to overcome the problems present in the prior art by increasing the controls the user has over the pixel resolution of this area. In a typical software application, images on the screen are represented to a resolution of 72 pixels per inch. The laser printer, on the other hand, has a resolution of 300 dots per inch, more than four times the resolution of that on a computer screen. Consequently, when an image is moved one pixel position on a computer screen, the corresponding printed image might be moved any where from between two to six pixel images in printing. While an offset of 1/100 of an inch may not be visible or significant in most laser printer applications (particularly when the relative spacing between images on the printed output is not affected), this problem is significant when the resolution and tolerance required by scanner 46 are also in the range of hundredths of inches. As displayed on screen 82, for every pixel that registration mark indicator 84 is moved on the screen either horizontally or vertically, overprint registration mark 60 on the paper will move 0.18 of a pixel, or approximately 0.0025 inches. Obviously, a laser printer cannot move a pixel 0.18 places. A pixel if either on or off. However, because the alignment coordinates are also used to generate offset values to adjust the location of individual response bubbles printed on scannable form 10, these offsets can be accumulated and the program will round-up or round-down appropriately to determine whether an individual pixel should be on or off.

Evaluate Movement 150 determines the number of horizontal and vertical pixels that registration mark indicator 84 was moved on alignment screen 82. Using this information, the movements are translated from 72 pixels per inch to 300 pixels per inch, and then to increments in terms of thousandths of an inch. These horizontal and vertical movement increments are then added to or substracted from the horizontal and vertical coordinates for the currently selected alignment mark as stored in temporary storage. The Menu 120 loop is then repeated until the user selects an option to exit from the loop.

The individual alignment coordinates and offset values determined by alignment process 100 are listed below. These parameters describe how the user-designed questions and response bubbles will be placed in the print area to achieve appropriate alignment with timing track 14.

Home—the horizontal and vertical distances from the top and left edges of sheet 12 to the center of QA mark 20.

Upper Right Vertical—the total distance from QA mark 20 to QA mark 22.

X-Column-Pixels—Upper Right Vertical divided by the maximum number of response bubbles 54 in a row, i.e. the distance between each vertical response bubble.

Upper Right Skew—any horizontal variance between the absolute value of the distance from the top edge of sheet 12 and the center of QA mark 20 and at QA mark 22.

Lower Left Skew—similar to Upper Right Skew, any vertical variance between the absolute distance from the edge of sheet 12 and the center of QA mark 20 and QA mark 24.

Lower Left Horizontal—total vertical distance from the center of QA mark 20 to the center of QA mark 24.

Y-Row-Pixels—Lower Left Horizontal divided by the maximum number of response bubbles 54 in a column, i.e., the distance between each horizontal response bubble.

Lower Right Skew—any horizontal variance between the center of QA marks 24 and QA marks 26.

Bubble-Y-Row-Max—52 response bubbles 54 in a row.

Bubble-X-Column-Max—45 response bubbles 54 in a column.

The use of the alignment coordinates and offset values of printing the response bubbles 54 and corresponding customized questions 52 that comprise survey form 50 is best shown in the flow chart for Print Verification Process 200 presented in FIGS. 8a–8b. In a preferred embodiment of the invention, the alignment coordinates and offset values are used to generate absolute vertical and horizontal placement values for characters and figures to be printed using the PostScript printer driver language. After the user has selected the print option at Select Print Process 202, the alignment coordinates for Home 130, Upper Right 132, Lower Left 134 and Lower Right 136 are retrieved along with the offset values for X-Column-Pixels, Upper Right Skew, Lower Left Skew, Y-Row-Pixels, and Lower Right Skew. For each graphic image, response bubble, customized question or alignment mark to be located on survey form 50, the element is offset by the absolute coordinates stored for Home 130. In effect, this offsets the entire print area of scannable form 10 by the targeted home coordinates.

At Text and Graphic To Print 204, the program determines whether there are any graphic pictures or text to print. If so, for each graphic or text item, the relative coordinates of that item are determined from the placement of the item by the user on a customization screen (not shown). At Place Text and Graphics 206, these relative coordinates are then modified with the alignment coordinates to determine where to place the item. In a preferred embodiment, each graphic or text item is represented as a rectangle whose corner coordinates will define the location of the item on scannable form 10. In locating the item, the following values are calculated:

Column Print Position=(Upper Left Vert. Relative Coordinate)*(X-Columns-Pixels/12).

Top Row Print Position=(Upper Left Horiz. Relative Coordinate)*(Y-Row-Pixel/15).

Bottom Row Print Position=Lower Left Horiz. Relative Coordinate-((Lower Left Horiz. Relative Coordinate-Upper Left Horiz. Relative Coordinate)/15)*15-Y-Row-Pixels)).

Once the graphic and text rectangles have been positioned, Bubbles To Print 208 determines whether there are any response bubbles 54 to be printed. If so, a unique secondary skunk mark 72 is calculated at Create Form ID Mark 210 based upon the number and positioning of the response bubbles 54. The secondary skunk marks 72 are used to identify the particular pattern of response bubbles 54 on this survey form 50 and to ensure that the proper version of the survey form will be scanned if more than one version of a survey form is created. Once secondary skunk marks 72 are calculated, they are located in the print area below bias bar 30 by Locate Form ID Mark 212.

At Locate Alignment Marks 214, alignment marks 90, 92, 94, and 96 are located in the print area based upon the alignment coordinate values of Home 130, Upper Right 132, Lower Left 134 and Lower Right 136. At Locate Reponse Bubbles 216, the center coordinates for each response bubble 54 to be printed are calculated based on the relative row and column values and the response bubble is located in the correct position in the print area. In locating reponse bubbles 54 and alignment marks 90, 92, 94, and 96, the following values are calculated:

Column Right Position=(Relative Row*Lower Left Skew)+(Relative Column*X-Column-Pixels).

Skew Max=(Relative Row/Bubble-Y-Row-Max)*(-Lower-Right Skew/Bubble-Y-Row-Max).

Skew Offset=Skew-Max*(Relative Column/Bubble-X-Column-Max).

Row Print Position=(Relative Row* Y-Row-Pixels)+((Upper-Right-Skew =Skew-Offset)*Relative Column).

The present invention overcomes the problems present in the prior art by performing the calculations for each of these values for each response bubble 54 to be located in the print area. Conventional software drawing programs do not perform this individualized placement; rather, a string of response bubbles might be tied together and all of the subsequent placements for the response bubbles in the string would be based upon displacements from the original response bubble. This is also the case if all of the items are located in the print area based on displacement values from a single axis location. By including the Lower Left Skew, Skew Max and Skew Offset in the calculations for placing each response bubble 54, there is no accumulation of skew errors in either the horizontal or vertical dimension that would otherwise result in a later-placed response bubble 54 to be misaligned with respect to its corresponding timing mark 16 and ultimately possibly scanned as a valid data mark. Because both the Column Print Position and the Row Print Position are rounded up or rounded down appropriately to the nearest pixel, the present invention achieves the finest resolution of which laser printer 44 is capable.

At Print Questionnaire 220, the print area for each survey form 50 has been completed and the survey form 50 is ready to be printed by laser printer 44. The user now has the option of entering a specific number of survey forms to be printed (Print Copies 222), or combining survey forms 50 with a mail merge file, such that certain portions of the text field or graphics are individually inserted into each survey form 50 to be printed (Mail Merge 224). In conjunction with the mail merge option, the user might also specify that an individual form ID number 76 and form ID number marks 74 also be printed on or below the bias bar 30 of scannable form 10. After the survey forms 50 have been printed, control is returned to the main screen via Return 230.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A scanner system for creating a survey form to be printed on a scannable form having a preprinted timing track and a plurality of preprinted quality assurance marks in specified relation thereto, said survey form having at least one stimulus and a corresponding response area, said scanner system comprising:

means for printing a plurality of overprint registration marks and said stimulus and its response area on a scannable form;

means for entering data specifying the degree to which the overprint registration marks are out of registration with said preprinted quality assurance marks;

data processing means for maintaining and adjusting data representing the location on said scannable form of said overprint registration marks and for formatting, maintaining and adjusting data representing the location of said stimulus and its response area relative to said overprint registration marks; and means for entering data specifying said stimulus item and its response area.

2. The scanner system of claim 1 wherein said preprinted quality assurance marks comprise a plurality of circle outlines, each of said circle outlines printed in a different corner of said scannable form, and wherein each said overprint registration mark comprises a solid shape, such that said overprint registration mark and said corresponding preprinted registration mark are in registration when each said overprint registration mark is centered within a corresponding circle outline.

3. A scannable form for use in the creation of a survey form having at least one stimulus and a corresponding response area to be printed on said scannable form, said scannable form comprising:
- a generally rectangular sheet of material;
- a plurality of timing marks printed along an edge of said rectangular sheet; and
- a plurality of quality assurance marks printed on said rectangular sheet in a predetermined relation to said timing marks, each of said quality assurance marks being adapted to receive an overprint registration mark in specified relation thereto, whereby when each overprint registration mark is in said specified relation to its corresponding quality assurance mark, said at least one response area can be printed in a predetermined relationship with at least one of said timing marks when said survey form is printed.

4. The scannable form of claim 3 wherein said quality assurance marks comprise four circle outlines, each circle outline generally located in a different corner of said rectangular sheet and wherein said overprint registration mark comprises a solid shape to be overprinted within said circle outline.

5. A method of aligning a survey form having at least one stimulus and a corresponding response area to be printed on a scannable form comprised of a sheet of material having a timing track preprinted along one edge and at least one quality assurance mark preprinted thereon is specified relation to said timing track, comprising the steps of:
- printing a first overprint registration mark on said scannable form at or adjacent to said at least one quality assurance mark;
- identifying the location of said anchor registration mark with respect to said at least one quality assurance mark to data processing means;
- adjusting in said data processing means the location of said first overprint registration mark on said scannable form so that said first overprint registration mark will achieve a predefined relation with said at least one quality assurance mark;
- reprinting said anchor mark and reidentifying and readjusting the printing location of said first overprint registration mark until it substantially achieves said predefined relation with said at least one quality assurance mark;
- using the adjustments made to the location of said first overprint registration mark relative to said at least one quality assurance mark to define the position of said response area in a specified relation to said preprinted timing track; and
- printing said survey form with said at least one stimulus and its response area in said specified realtion to said preprinted timing track.

6. The method as recited in claim 5 further comprising the step of printing at least one alignment mark in the position defined for said overprint registration mark during the printing of said survey form.

* * * * *